United States Patent [19]

Havas et al.

[11] Patent Number: 5,336,738
[45] Date of Patent: Aug. 9, 1994

[54] KILL-GAS INTRODUCTION TO A FLUIDIZED BED REACTOR CONTAINING CHROMIUM OXIDE CATALYST

[75] Inventors: Laszlo Havas, Martigues; Claudine Lalanne-Magne, Lavera; John G. Speakman, Martigues, all of France

[73] Assignee: BP Chemicals Limited, London, England

[21] Appl. No.: 739,814

[22] Filed: Aug. 2, 1991

Related U.S. Application Data

[63] Continuation-in-part of Ser. No. 733,343, Jul. 22, 1991, abandoned.

[30] Foreign Application Priority Data

Aug. 7, 1990 [FR] France ................................ 9010281

[51] Int. Cl.$^5$ ................................ C08F 2/42
[52] U.S. Cl. ........................ 526/82; 526/83; 526/84
[58] Field of Search ................ 526/84, 82, 83

[56] References Cited

U.S. PATENT DOCUMENTS 4,306,044 12/1981 Charsley ........................ 526/84
4,326,048 4/1982 Stevens et al. .................. 526/84
4,547,555 10/1985 Cook et al. ..................... 526/60
5,066,736 11/1991 Dumain et al. .................. 526/82

FOREIGN PATENT DOCUMENTS 116917 8/1984 European Pat. Off. ........... 526/84

*Primary Examiner*—Joseph L. Schofer
*Assistant Examiner*—Tom Weber
*Attorney, Agent, or Firm*—Brooks Haidt Haffner & Delahunty

[57] ABSTRACT

The present invention relates to a process for stopping an olefin polymerization which is carried out in a low pressure gas phase reactor, which process comprises introducing an effective quantity of deactivating agent into the reactor, characterized in that the olefin polymerisation is carried out using a chromium oxide catalyst and in that the deactivating agent is selected from oxygen, ammonia, water and carbon monoxide and is introduced over a relatively short period of time. The deactivating agent is preferably introduced into the polymerization reactor in a quantity such that in the reactor the weight ratio of the deactivating agent to the catalyst is at least 0.001.

12 Claims, No Drawings

KILL-GAS INTRODUCTION TO A FLUIDIZED BED REACTOR CONTAINING CHROMIUM OXIDE CATALYST

This application is a continuation-in-part of application Ser. No. 07/733,343 filed on Jul. 22, 1991, now abandoned.

The present invention relates to a process for stopping a gas phase polymerisation reaction.

It is known that one or more olefins can be polymerized in a gaseous phase reaction. For example, it is known to polymerise one or more olefins in a fluidized bed reactor by passing a reaction gas mixture containing the olefin(s) to be polymerised upwardly through the reactor such that the upwardly moving reaction gas keeps the polymer particles which are being formed by the reaction in a fluidised state. The gas mixture leaving through the top of the fluidised-bed reactor is recycled to the base of the latter through a recycle conduit and a compressor. During this recycling the gas mixture is generally cooled with the aid of a heat exchanger so as to remove the heat produced during the polymerisation reaction.

In a process of this kind it is possible to employ a high-activity catalyst capable of producing large quantities of polymer in a relatively short time. It is possible with such high activity catalysts to avoid a stage for removal of the catalyst residues from the polymer. High activity catalysts consisting essentially of a chromium oxide activated by heat treatment and associated with a granular support based on refractory oxide are known. The catalyst is introduced into the reactor continuously or intermittently, while the polymer formed in the fluidised bed is drawn off from the bottom of the reactor, also continuously or intermittently.

For various reasons, especially when a mechanical breakdown is detected such as, for example, a failure of the compressor or of the system enabling the polymer output to be drawn off from the bottom, it may be necessary to stop the polymerisation reaction quickly. If possible, this stoppage must be carried out according to a process satisfying all the desired safety measures and under such conditions that restarting of the polymerisation reaction can take place quickly without having to empty the polymerisation reactor of its bed. To carry out a quick stoppage of a gas phase olefin polymerisation reaction, it is possible to quench the reaction gas mixture, that is to say to cool it very quickly to low temperature. However, such a method presents the major disadvantage of being feasible only with a polymerisation reactor equipped with heat exchangers which have a very high exchange capacity. Furthermore, even at low temperature, it is found that the polymerisation reaction is not stopped completely and this results in the production of a polymer of a different quality, in particular a polymer which has a different melt index.

European Patent EP-B-004,417 describes a process for stopping an olefin polymerisation reaction carried out in a gas phase polymerisation reactor with the aid of a Ziegler Natta type catalyst, which process comprises introducting carbon dioxide into the polymerisation reactor. It has been found, however, that this process is ill-suited to stopping an alpha-olefin polymerisation reaction performed with the aid of a chromium oxide-based catalyst, because this catalyst is effectively not deactivated by carbon dioxide.

European Patent Application EP-A-359 444 describes a process for maintaining a constant rate of olefin gas phase polymerisation. In this process various catalyst deactivating agents are continuously introduced in a gas phase polymerisation reactor. However this process does not teach or suggest whether the deactiving agents are effective for stopping olefin gas phase polymerisation.

An effective process for completely or practically completely stopping a gas phase alpha-olefin polymerisation reaction carried out with the aid of a chromium oxide-based catalyst has now been found, which avoids or at least mitigates the above mentioned disadvantages. In particular, the process according to the present invention uses a relatively small quantity of a deactivating agent. Furthermore, this process can be carried out safely without being obliged to cool the reaction gas mixture to a low temperature. Moreover, the restarting of the polymerisation reaction can be carried out quickly without having to empty the polymerisation reactor.

Thus according to the present invention a process stopping an olefin polymerisation which is carried out in a low pressure gas phase reactor, which process comprises introducing an effective quantity of deactivating agent into the reactor, is characterised in that the olefin polymerisation is carried out using a chromium oxide catalyst and in that the deactivating agent is selected from oxygen, ammonia, water and carbon monoxide and is introduced over a relatively short period of time.

According to the present invention, as soon as it is desired to stop the polymerisation reaction, it is essential to introduce into the reactor a deactivating agent selected from oxygen, ammonia, water and carbon monoxide. Surprisingly it was found that these compounds are very efficient deactiving agents for stopping an olefin polymerisation carried out in the gas phase with a chromium oxide catalyst. It is to be understood that the term "the stoppage of an olefin polymerisation" as used in this specification means that there is no or very low olefin consumption in the gas phase reactor. For example, when the polymerisation is carried out in a fluidised bed reactor, the stoppage of the polymerisation can be indicated by observing a low differential temperature over the height of the fluidised bed, typically less than 2° C.

The deactivating agent may be employed alone or, preferably, diluted in an inert gas. When oxygen is employed as deactivating agent, it may be employed in the form of a gaseous mixture with an inert gas such as nitrogen, preferably in a quantity not exceeding 5% by volume of oxygen. In some cases it is also possible to employ surrounding air or preferably oxygen-depleted air. When water is employed as deactivating agent it is preferable that it should be employed in vapour form, more preferably in a gas mixture comprising an inert gas such as nitrogen. A mixture of two or more catalyst-deactivating agents may be employed.

The deactivating agent is introduced into the polymerisation reactor in a quantity which is sufficient to deactivate substantially all the catalyst present in the polymerisation reactor and thus to stop the polymerisation reaction. For this purpose the deactivating agent is preferably introduced into the polymerisation reactor in a quantity such that in the reactor the weight ratio of the deactivating agent to the catalyst is at least 0.001. The use of a quantity of deactivating agent which is too small would have little or no effect on the catalyst and it would be difficult to observe a stoppage of the polymerisation reaction. There is no upper limit for the quantity of deactivating agent to be used. However, due to the use of efficient deactivating agents, the quantity of deactivating agent is often such that in the reactor the weight ratio of the deactivating agent to the catalyst can be lower than 0.2.

In practice, the quantity of deactivating agent introduced in the reactor is from 1 to 10 times and preferably from 2 to 3 times the minimum quantity necessary for stopping the olefin polymerisation. This minimum quantity can be obtained by previous experimentation performed in a gas phase reactor working with known quantities of catalyst and of deactivating agent. For example it has been found to be possible to stop a gas phase olefin polymerisation by introducing into the polymerisation reactor per kilogram of catalyst, from 2 to 80 g of oxygen, or at least 2 g and preferably from 10 to 80 g of water, or from 3 to 130 g of carbon monoxide.

The deactivating agent is introduced into the reactor over a relatively short period of time typically less than 5 minutes. The period of introduction of the deactivating agent is advantageously as short as possible and is preferably shorter than one minute and more preferably shorter than 30 seconds. Furthermore, it is also desirable to discontinue the feeding to the polymerisation reactor of olefin and/or catalyst. Under these conditions a stoppage of the polymerisation reaction is observed quickly, generally in less than 10 minutes and in many cases in less than 5 minutes after the end of the introduction of the deactivating agent into the polymerisation reactor.

Surprisingly it has been found that the process according to the present invention can be used to rapidly stop a gas phase fluidised bed polymerisation reaction using chromium oxide catalyst even when the operation is carried out in large industrial reactors where enormous volumes of gas are used during the polymerisation.

The present invention enables a gas phase polymerisation reaction to be stopped without being obliged to remove the reaction gas mixture from the polymerisation reactor system. However, before restarting the polymerisation reaction, a part of this reaction mixture may have to be purged in order to remove from the reactor any remaining deactivating agent. Also the process according to the present invention allows the polymerization reaction to be restarted without draining the bed, simply by feeding the reactor again with fresh catalyst and olefin.

According to the present invention the polymerisation catalyst employed is a catalyst comprising a chromium oxide compound. Such catalysts comprise chromium oxide associated with a granular support, preferably a support based on a refractory oxide, the supported catalyst being activated by a heat treatment performed advantageously at a temperature of at least 250° C. and not exceeding the temperature at which the granular support begins to sinter and under a non reducing atmosphere, preferably an oxidising atmosphere. This catalyst may be obtained by a large number of known processes. For example it may be obtained by a two stages process. In the first stage of this process, a chromium compound such as a chromium oxide generally of formula $CrO_3$, or a chromium compound capable of being converted into chromium oxide by calcination, such as, for example, a chromium nitrate or sulphate, an ammonium chromate, a chromium carbonate, acetate or acetylacetonate or a tert-butyl chromate, is associated e.g. by impregnation with a granular support based on refractory oxide such as, for example, silica, alumina, zirconium oxide, thorium oxide, titanium oxide or mixtures or coprecipitates of two or more of these oxides. In the second stage of this process the chromium compound thus associated with the granular support is subjected to an activation operation by heat treatment at a temperature of at least 250° C. and not exceeding the temperature at which the granular support begins to sinter; the temperature of the heat treatment is generally between 250° and 1200° C., and preferably between 350° and 1000° C. This heat treatment is performed in a non reducing atmosphere, preferably in an oxidising atmosphere, generally consisting of a gas mixture containing oxygen, such as, for example, air. The length of the heat treatment may be between 5 minutes and 24 hours, preferably between 30 minutes and 15 hours, so that at the end of this treatment the chromium compound is at least partially in the hexavalent state. The weight content of chromium in the catalyst thus obtained is generally between 0.05 and 30%, and preferably between 0.1 and 3%.

The granular supports based on refractory oxide which can be employed in the preparation of the catalysts according to the invention are generally in the form of solid particles which may have a mass-average diameter of between 20 and 300 microns.

The operation of activating the catalyst may be performed in the presence of fluorine compounds chosen from ammonium hexafluorotitanate, tetrafluoroborate and hexafluorosilicate, and optionally in the presence of a titanium compound chosen from titanium alcoholates. The catalysts thus prepared contain titanium fluorides and oxide. The weight contents of fluorine and of titanium in these catalysts may be between 0.05 and 8% and 0.1 and 20% respectively.

When the olefin polymerisation takes place in a fluidised bed reactor the catalyst employed in the process of the invention may be advantageously used in the form of a prepolymer. The latter may be prepared during a prepolymerisation stage which comprises bringing the chromium oxide-based catalyst into contact with at least one alpha-olefin containing from 2 to 12 carbon atoms. The prepolymerisation may be performed in one or more stages, either in suspension in a liquid hydrocarbon medium or in gaseous phase in a reactor containing a fluidised bed and/or equipped with a mechanical stirring system, at a temperature which is preferably between 40° and 115° C. The prepolymerisation may be advantageously carried out in the presence of at least one organometallic compound of a metal of groups I to III of the Periodic Classification of the Elements, such as an organoaluminium, organomagnesium or organozinc compound. The prepolymerisation is generally conducted until the prepolymer contains from $10^{-5}$ to 3, preferably from $10^{-3}$ to $10^{-1}$ millimoles of chromium per gram of prepolymer.

To perform the gas phase olefin polymerisation reaction the catalyst, optionally in the form of a prepolymer, is introduced into the polymerisation reactor in order to bring it into contact with the gas mixture containing the olefins to be polymerised. The catalyst can be introduced into the reactor in the form of a dry powder or as a suspension in an inert liquid hydrocarbon. This introduction can be carried out as the polymerisation reaction progresses and may, be performed continuously or intermittently.

In order to increase the yield of the polymerisation reaction it is advantageous to introduce into the reactor, independently of the catalyst, an organometallic compound of a metal of groups I to III of the Periodic Classification of the Elements. This organometallic compound makes it possible to destroy the poisons which are present in the reaction mixture and, additionally, to improve the control of the average molecular mass, as well as the molecular mass distribution of the polymer produced. This organometallic compound may be an organoaluminium compound such as triethylaluminium, triisobutylaluminium, tri-n-hexylaluminium or tri-n-octylaluminium; an organomagnesium compound or else an organozinc compound. This organometallic compound is employed in such quantity that the molar ratio of the quantity of metal of the said organometallic compound to the quantity of chromium present in the reactor containing a fluidised bed does not exceed 100, and is preferably between 0.1 and 20. This compound is preferably used in the form of a solution in a saturated aliphatic hydrocarbon containing, for example, from 4 to 7 carbon atoms, in order to facilitate its dispersion in the polymerisation mixture. When an organometallic compound of this kind is employed in the process of the present invention it is desirable to stop its introduction into the reactor and preferably at the same time as that of the catalyst in order to be able to stop the polymerisation reaction as quickly as possible.

The polymerisation reaction may be carried out in a reactor containing a fluidised and/or mechanically stirred bed using techniques and apparatus which are known per se such as those described in French Patent No. 2,207,145 or French Patent No. 2,335,526. The apparatus can comprise essentially a fluidised-bed polymerisation reactor comprising a vertical cylinder equipped with a fluidisation grid and supporting a disengagement chamber, a conduit for recycling the gas mixture, connecting the top of the disengagement chamber to the base of the reactor, which recycle conduit is provided with at least one heat exchanger and a gas compressor and with a conduit for feeding alpha-olefins. The deactivating agent may be introduced directly into the reactor, preferably into a reactor zone where the dispersion of the deactivating agent is fast, for example under the fluidisation grid. It may also be introduced into the conduit for recycling the reaction gas mixture, preferably at a point situated as close as possible to the latter's return to the polymerisation reactor.

The process of the invention is perfectly suited for stopping a gas phase polymerisation reaction of one or more alpha-olefins containing from 2 to 12 carbon atoms such as a gas phase ethylene polymerisation. It is also suited for stopping an ethylene copolymerisation reaction with at least one alpha-olefin containing from 3 to 12 carbon atoms such as propylene, butene-1, methyl-4 pentene-1, and octene-1 . These polymerisation reactions are generally performed at a pressure of 0.1 to 5 MPa and at a temperature of 0° to 120° C. and more particularly 80° to 110° C. The reaction gas mixture may contain hydrogen and an inert gas chosen, for example, from nitrogen, methane, ethane, propane, butane, isobutane or isopentane. When a fluidised-bed reactor is employed the fluidisation velocity of the reaction gas mixture passing through the bed is from 2 to 8 times the minimum fluidisation velocity, that is to say generally from 20 to 120 cm/s. The polymer manufactured is drawn off at the bottom continuously or, preferably, intermittently.

The following examples illustrate the present invention.

Example 1: Manufacture of a high density polyethylene

The operation is carried out in a fluidised-bed gas phase polymerisation reactor consisting of a vertical cylinder 3 m in diameter and 10 m in height and supporting a disengagement chamber. The reactor is fitted with a fluidisation grid in its lower part and with an external conduit for recycling a reaction gas mixture, connecting the top of the disengagement chamber to the lower part of the reactor, situated under the fluidisation grid. The recycle conduit is equipped with a compressor with a heat transfer means. A conduit for introducing a gas mixture of oxygen and nitrogen containing 5% by volume of oxygen, from a 60-liter bottle at a pressure of 8 MPa opens into the recycle conduit at a distance of 5 m from the reentry in the lower part of the reactor.

Above the fluidisation grid the reactor contains a fluidised bed consisting of 16 tonnes of a high density polyethylene powder, consisting of particles with a mass-average diameter of 1.1 mm. The reaction gas mixture, which contains 45% by volume of ethylene, 19.5% of hydrogen and 35.5% of nitrogen, flows through the fluidised bed at a pressure of 1.8 MPa, at 106° C. and with an upward fluidisation velocity of 0.55 m/s.

An chromium oxide-based catalyst (A) is prepared by subjecting a catalyst sold under registred trade mark "EP 307" by Joseph Crosfield and Sons (Warrington, Great Britain) for 5 hours to a heat treatment at 550° C. in a fluidised-bed reactor, with the aid of a stream of dry air. The catalyst (A) contains 1% by weight of chromium in the form of chromium oxide of formula $CrO_3$ and 3.8% by weight of titanium in the form of titanium oxide of formula $TiO_2$, coupled with a silica support.

The catalyst is converted into the form of a prepolymer in a 30 $m^3$ stainless steel reactor fitted with a stirring system rotating at 140 revolutions per minute. Into this reactor are introduced under nitrogen atmosphere 10 $m^3$ of n-hexane, which are heated to 75° C., followed by 16 moles of tri-n-octylaluminium (TnOA) and 250 kg of the catalyst (A). Ethylene is then introduced for 8 hours and 20 minutes at a rate of 300 kg/h. At the end of this time the reactor is cooled to 60° C. and is degassed. 5 $m^3$ of n-hexane heated to 60° C. and containing 10.7 moles of TnOA are added to the prepolymer suspension, which is kept stirred under these conditions for 15 minutes, before approximately 5 $m^3$ of the liquid phase are extracted from this suspension. This operation is repeated twice and the prepolymer suspension is then cooled to room temperature (20° C.) and 10.7 moles of TnOA are added to it. The prepolymer is dried under a stream of nitrogen at 70° C. and the prepolymer is isolated in the form of a dry powder.

The prepolymer containing the chromium oxide-based catalyst is introduced intermittently in the course of time into the fluidised-bed reactor at a rate of 0.42 kg of prepolymer every 1.8 minutes. Simultaneously, a solution of triethylaluminium (TEA) in n-hexane, containing 0.1 mole of TEA per liter, is introduced continuously at a rate of 2 liters/h into the conduit for recycling the reaction gas mixture, at a point situated upstream but close to the heat transfer means. A homopolyethylene with a relative density of 0.952, a melt index of 1.2 g/10 minutes under a 5-kg load at 190° C. and with a chromium content of 3.5 ppm is thus manufactured in the form of a powder consisting of particles with a mean diameter of 1100 microns, in an output of 4 tonnes per hour.

An incident is simulated by stopping the compressor. The introduction of prepolymer and that of the TEA solution are stopped immediately and a gas mixture of oxygen and of nitrogen contained in the 60-liter bottle is introduced into the reactor over approximately 20 seconds, in a quantity corresponding to 225 g of oxygen, that is to say by making the pressure in the bottle drop from 8 to 2 MPa. It is found that the reaction stops very quickly (less than 10 minutes) without producing detrimental effects, such as the formation of agglomerates in the bed.

Under these conditions, it is possible to restart the polymerisation reaction by restarting the compressor and then recommencing the introduction of the TEA solution and of the prepolymer, without having to drain the bed and even without having to purge the reaction gas mixture from the reactor.

Example 2: Manufacture of linear low density polyethylene

The operation is carried out under conditions which are identical with those given in Example 1, except for the fact that the reaction gas mixture contains 33% by volume of ethylene, 0.5% of 4-methyl-l-pentene, 16.5% of hydrogen and 50% of nitrogen at a pressure of 1.8 MPa, at 95° C., with an upward velocity of 0.5 m/s.

A copolymer of ethylene with 4-methyl-1-pentene, with a relative density of 0.930 is manufactured under these conditions in an output of 4 tons per hour.

The same incident as in Example 1 is simulated and the operation is carried out in the same way. Stoppage of the reaction is observed in a time of less than 10 minutes, without agglomerate formation. The copolymerisation reaction can be restarted as in Example 1.

Example 3: Manufacture of a high density polyethylene

The operation is carried out in a fluidised-bed polymerisation reactor consisting of a vertical cylinder 0.90 m in diameter, 6 m in height, fitted in its lower part with a fluidisation grid and supporting a disengagement chamber. This reactor is fitted with an external conduit for recycling a reaction gas mixture connecting the top of the disengagement chamber to the lower part of the reactor, situated under the fluidisation grid and which is equipped with a compressor and with a heat exchanger. A conduit for introducing a gaseous mixture of oxygen and nitrogen containing 5% by volume of oxygen, from a 60-liter bottle at a pressure of 8 MPa, opens into the recycle conduit at a distance of 3 m from the recycle reentry into the lower part of the reactor.

The reactor contains a fluidised bed maintained at a constant height of 2 m above the fluidisation grid, which consists of 430 kg of a high density polyethylene powder (relative density 0.96) in the form of particles with a mass-average diameter of 1.1 min.

A gas mixture at a temperature of 108° C. and containing 40% by volume of ethylene, 17% of hydrogen and 43% of nitrogen at a pressure of 1.8 MPa enters the base of the fluidised-bed reactor at a rate of 15,500 $Nm^3/h$ and rises in the fluidised bed with an upward fluidisation velocity of 0.5 m/s.

A chromium oxide-based catalyst (B) is prepared in a fluidised-bed activation reactor by subjecting a catalyst sold under the name registred trade mark EP30 by Joseph Crosfield and Sons (Warrington, Great Britain) to a heat treatment at 815° C. for 5 hours. The catalyst (B) contains 1% by weight of chromium in the form of chromium oxide of formula $CrO_3$, associated with a silica support.

This catalyst (B) is converted into the form of a prepolymer in a 1-$m^3$ stainless steel reactor fitted with a stirring system rotating at 140 revolutions per minute. Into this reactor are introduced under nitrogen atmosphere 500 liters of n-hexane which are heated to 75° C., 264 millimoles of tri-n-octylaluminium (TnOA) and 6 kg of the catalyst (B). Ethylene is then introduced for 4 hours at a rate of 15 kg/h. At the end of this time, the reactor is cooled to 60° C. and is degassed. 300 liters of n-hexane heated to 60° C. and containing 72 millimoles of TnOA are added to the prepolymer suspension obtained, which is kept stirred under these conditions for 15 minutes before approximately 300 liters of the liquid phase are extracted from this suspension. This operation is repeated twice and the prepolymer suspension is then cooled to room temperature (20° C.) and 144 millimoles of TnOA are added to it. The prepolymer is dried in a stream of nitrogen at 70° C. and the prepolymer is isolated in the form of a dry powder.

The prepolymer containing the chromium oxide-based catalyst is introduced intermittently in the course of time into the gas phase fluidised-bed reactor at a rate of 0.03 kg of prepolymer every 6 minutes. Simultaneously, a solution of triethylaluminium (TEA) in n-hexane containing 0.1 mole of TEA per liter is introduced continuously at a rate of 0.06 l/h into the conduit for recycling the reaction gas mixture, at a point situated upstream and close to the heat exchanger. 90 kg/hour of a density homopolyethylene with a melt index equal to 1.2 g/10 minutes under a 5-kg load at 190° C. and a chromium content of 3 ppm are manufactured under these conditions.

An incident is simulated by stopping the compressor. The introduction of prepolymer and that of the TEA solution are stopped immediately and a gaseous mixture of oxygen and nitrogen contained in the 60-liter bottle is introduced into the reactor over approximately 30 seconds in a quantity corresponding to 5 g of oxygen, that is to say by making the bottle pressure fail from 8 to 7.86 MPa. It is found that the polymerisation reaction stops very quickly, in less than 10 minutes, without any detrimental effects being observed, such as the formation of agglomerates in the bed.

After this stoppage, the polymerisation reaction can be restarted by restarting the compressor and then recommencing the introductions of the TEA solution and of prepolymer, without having to drain the bed and even without having to purge the reaction gas mixture from the reactor.

We claim:

1. A process for stopping an olefin polymerisation which is carried out in a low pressure gas phase reactor, which process comprises introducing an effective quantity of deactiving agent into the reactor characterised in that the olefin polymerisation is carried out using a chromium oxide catalyst and in that the deactivating agent is selected from the group consisting of oxygen, ammonia, water and carbon monoxide and is introduced over a relatively short period of time.

2. A process according to claim 1, characterised in that the quantity of the deactivating agent introduced is from 1 to 10 times the minimum quantity necessary for stopping the olefin polymerisation.

3. A process according to claim 2, characterised in that the quantity of the deactivating agent introduced is in the range from 2 to 3 times the minimum quantity necessary for stopping the olefin polymerisation.

4. A process according to claim 1, characterised in that the deactivating agent is oxygen and is introduced in a quantity in the range from 2 to 80 g per kilogram of catalyst.

5. A process according to claim 1, characterised in that the deactivating agent is water and is introduced in a quantity in the range from 10 to 80 g per kilogram of catalyst.

6. A process according to claim 1, characterised in that the deactivating agent is carbon monoxide and is introduced in a quantity in the range from 3 to 130 g per kilogram of catalyst.

7. A process according to claim 1, characterised in that the feeding of catalyst into the reactor is discontinued.

8. A process according to claim 1, characterised in that the feeding of olefin into the reactor is discontinued.

9. A process according to claim 1, characterised in that the introduction of an organometallic compound into the reactor is stopped.

10. A process according to claim 1, characterised in that the introduction of the deactivating agent into the reactor is performed over a period shorter than 5 minutes.

11. A process according to claim 1, characterised in that the reactor is a fluidised bed reactor.

12. A process according to claim 11, characterised in that the catalyst is in the form of a prepolymer.

* * * * *

UNITED STATES PATENT AND TRADEMARK OFFICE
CERTIFICATE OF CORRECTION

PATENT NO. : 5,336,738
DATED : August 9, 1994
INVENTOR(S) : Laszlo Havas, et al

It is certified that error appears in the above-indentified patent and that said Letters Patent is hereby corrected as shown below:

Col. 8, l. 46, Change "fail" to -- fall --.

Signed and Sealed this

Thirteenth Day of December, 1994

Attest:

BRUCE LEHMAN

*Attesting Officer*   *Commissioner of Patents and Trademarks*